J. W. WHITFORD.
MACHINE FOR CUTTING AND WELDING METALS BY MEANS OF GASES.
APPLICATION FILED OCT. 30, 1911.
1,068,721.
Patented July 29, 1913.
4 SHEETS—SHEET 3.
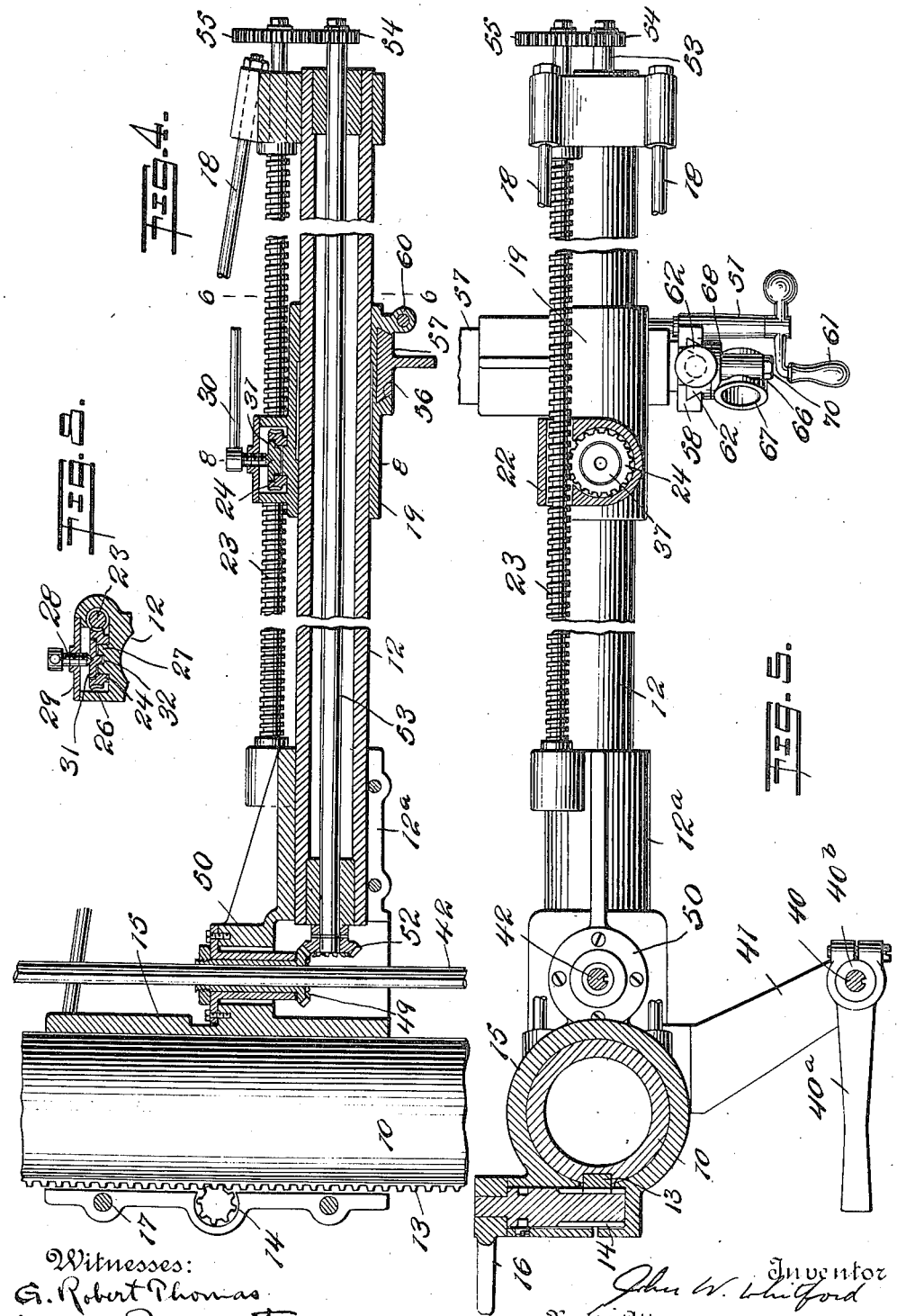

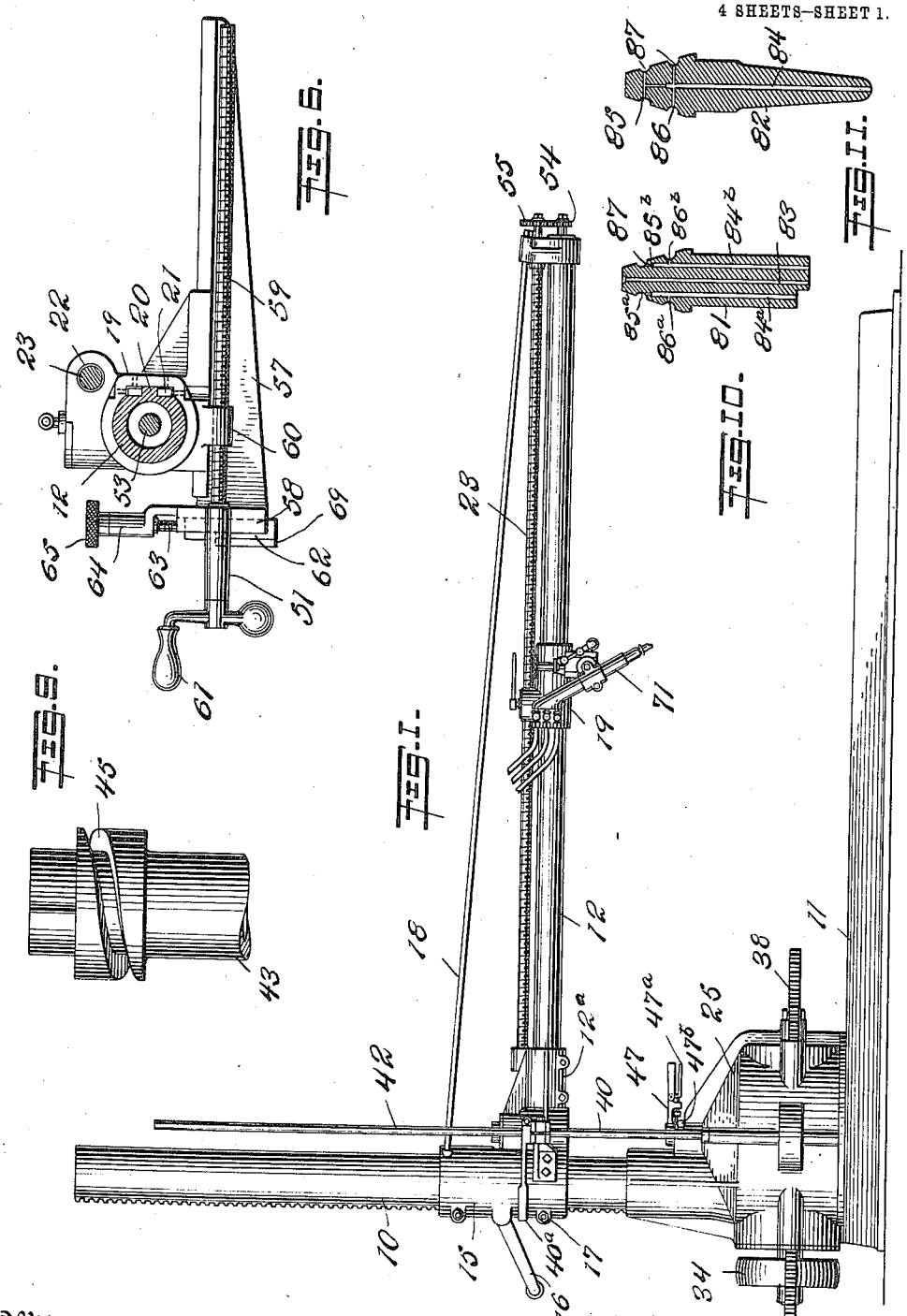

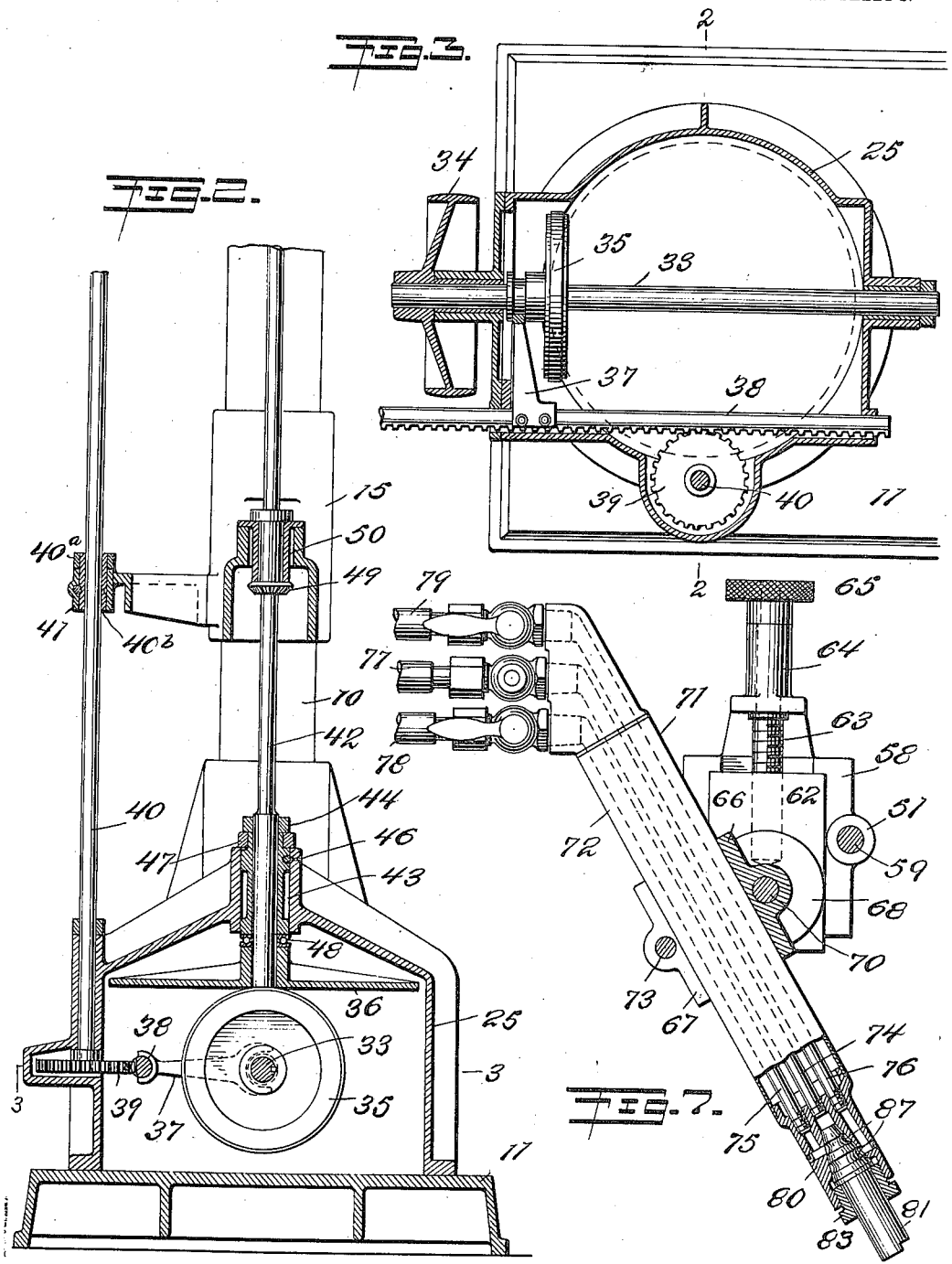

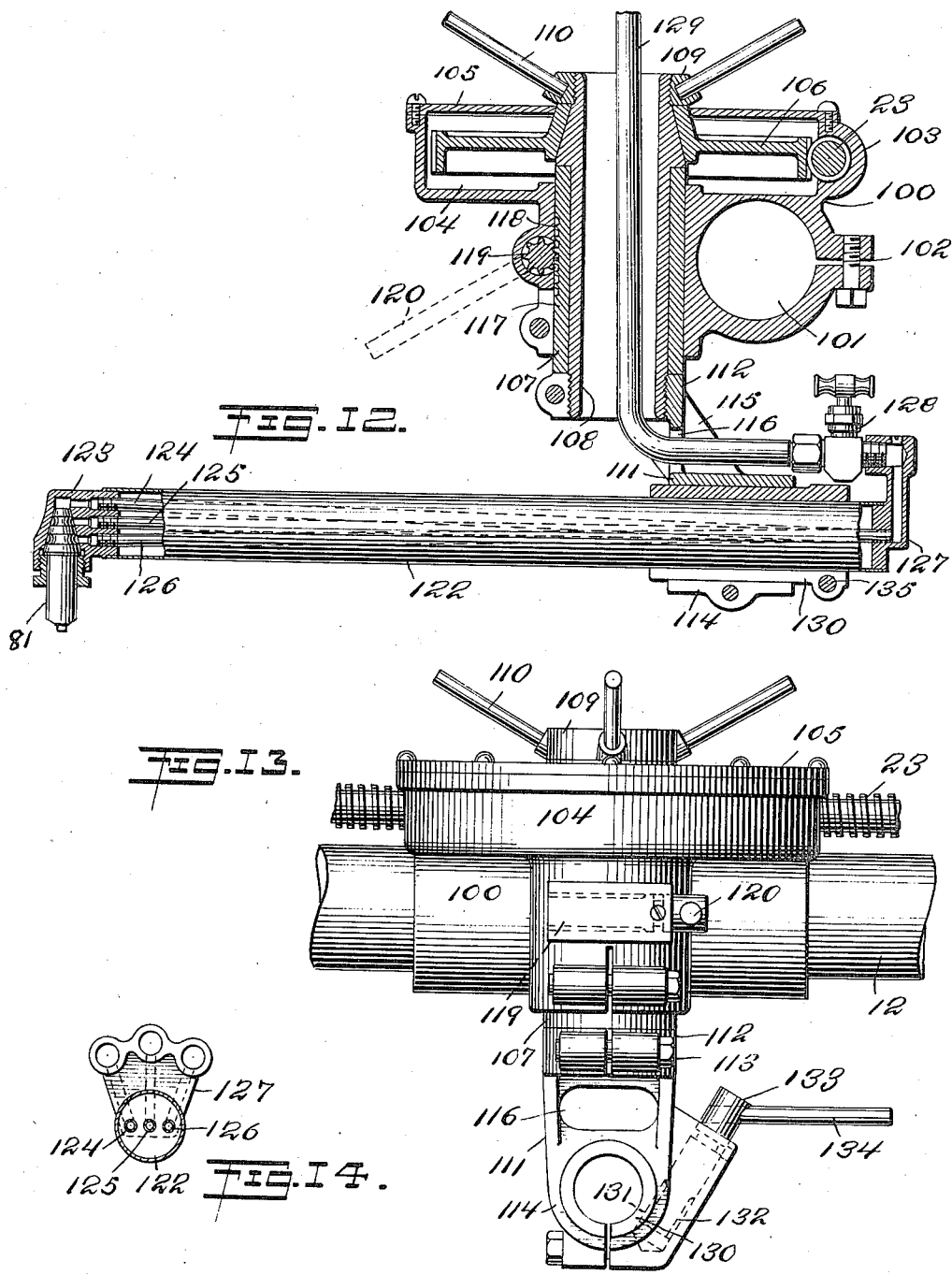

UNITED STATES PATENT OFFICE.

JOHN WALTER WHITFORD, OF JERSEY CITY, NEW JERSEY, ASSIGNOR TO DAVIS-BOURNONVILLE COMPANY, OF NEW YORK, N. Y., A CORPORATION OF NEW YORK.

MACHINE FOR CUTTING AND WELDING METALS BY MEANS OF GASES.

1,068,721. Specification of Letters Patent. Patented July 29, 1913.

Application filed October 30, 1911. Serial No. 657,539.

*To all whom it may concern:*

Be it known that I, JOHN WALTER WHITFORD, a citizen of the United States, a resident of Jersey City, in the county of Hudson and State of New Jersey, have invented certain new and useful Improvements in Machines for the Cutting and Welding of Metals by Means of Gases, of which the following is a specification.

The object of this invention is to produce a machine, embodying many novel and useful features of construction and capable of performing a great variety of work, for guiding and propelling, either heating and cutting, or welding, jets, at variable speed, and along different paths, to which the jet or jets are adjustable, conveniently and with precision, in vertical and horizontal planes (assuming the lines of travel to be horizontal), the direction of the jets being also variable angularly in the vertical plane of the line of travel.

Further objects are to provide advantageous means whereby the jets may be propelled by power in either direction and at variable speed, to provide means for delicately varying the speed to suit the special conditions of the particular work being performed, to provide convenient and reliable means for starting and stopping the travel of the jets, and to provide improved means whereby the longitudinally traveling carriage may be returned quickly to starting position without disengaging it from the propelling screw.

Other objects and features of the invention will become apparent as the specification proceeds.

In the accompanying drawings illustrating the invention by means of the preferred embodiment thereof: Figure 1 is a side view of the machine; Fig. 2 is a sectional elevation taken on the line 2—2 of Fig. 3; Fig. 3 is a sectional plan taken on the line 3—3 of Fig. 2; Fig. 4 is a sectional, fragmentary elevation, taken through the standard and radial arm; Fig. 5 is a sectional plan of the parts shown in Fig. 4; Fig. 6 is a section on the line 6—6 of Fig. 4, parts being omitted; Fig. 7 is a detail side view, showing the torch, torch-carrier, and vertically and laterally adjustable carriages, parts being in section; Fig. 8 is a fragmentary section on the line 8—8 of Fig. 4; Fig. 9 is a fragmentary detail; Figs. 10 and 11 are detail sectional views showing forms of cutting and welding tips; Fig. 12 is a sectional elevation of a circular cutting or welding attachment; Fig. 13 is an elevation at right angles to Fig. 12; and Fig. 14 is a sectional elevation taken at the rear part of the torch shown in Figs. 10 and 11.

The numeral 10 indicates a standard supported on a suitable base 11, which preferably extends for a considerable distance in advance of the standard, so as to afford a surface upon which may be placed suitable supports for the work.

12 is a radial arm mounted on the standard, projecting over the base. Means are provided for raising and lowering the arm, there being a rack 13 on the standard and a pinion 14 carried by the sleeve portion 15 of the arm and having a handle crank 16. This sleeve portion or vertically adjustable support is split, and may be clamped at any height by means of bolts or screws 17. The arm is carried wholly by said support and may be braced by rods 18.

Upon the arm is a longitudinally traveling carriage 19. This carriage is preferably slidably mounted and guided on the arm. In the particular construction shown the arm is cylindrical and has a guide rib 20 machined on one side (see Fig. 6). The carriage is provided with a corresponding opening to receive the arm and guide. Screw-adjusted gibs 21 enable looseness between the arm and carriage to be taken up. The carriage is also furnished with an opening 22 through which a screw 23 passes loosely. This screw shaft is suitably journaled at its ends in bearings carried by the arm.

Novel means are provided for causing the screw to drive the carriage. A worm wheel 24 (see Figs. 4 and 8) is located in a recess 26 formed in the top of the carriage in engagement with the threads on the screw. This wheel may rotate about a bearing boss 27 projecting upward from the bottom of the recess, and has a suitable friction surface on its under side adapted to be forced against a friction surface on the bottom of the recess to keep the wheel from turning. The wheel may be clamped by a set screw 28 threaded through a cap 29 over the recess and having a handle 30 for convenient manipulation. A washer 31 is interposed between the end of the screw and the top of the wheel. To keep this washer from being turned by the wheel, which would tend to turn the set screw, it has a rib 32 on its under side that takes into a slot in the top of the boss 27.

The preferred means for driving the screw 23 will now be described.

A horizontal shaft 33 is journaled within a casing 25 at the base of the standard, and carries a pulley 34 outside the standard, by means of which it may be driven by a belt from a power shaft. Mounted on the shaft 33 inside the base of the standard, in such manner as to be slidable on the shaft but fixed thereto as to rotation is a friction wheel 35, the periphery of which engages the under surface of a friction disk 36. The friction wheel may be shifted across the face of the disk to secure any speed, within the limits made possible by the proportions, and to reverse the direction of drive. To this end a shipper fork 37 is mounted on a rack bar 38, the teeth of which mesh with a pinion 39 on the lower end of a shaft 40, the upper part of which passes through an opening in a bracket 41 carried by the sleeve portion 15 of the radial arm. A handle 40$^a$ affords means for turning the shaft, to operate the shipper fork. The handle 40$^a$ is preferably secured to a sleeve 40$^b$, which is rotatable in the bracket 41, but held against vertical movement relative thereto, the sleeve being connected slidably to the shaft 40 by means of a spline.

The friction disk 36 is secured to the lower end of a vertical shaft 42. It passes through a bearing or bushing 43 which fits into an opening in the casing 25. This bearing may be raised and lowered to raise and lower the friction disk. For this purpose a collar 44 is secured to the shaft 42 immediately above the bearing, and the bearing is provided in its side with a cam or spiral groove 45 (see Fig. 9) receiving a fixed pin or projection 46. A handle 47 is fixed to the upper end of the bearing, to afford means for turning the same. A thrust bearing 48 is preferably interposed between the lower end of the bearing and the disk 36. The handle 47 may have a latch 47$^a$ for engagement with a retaining rack or segment 47$^b$.

The shaft 42 is connected with a bevel gear 49 thereon by means of a spline or feather, so that either the shaft or the gear may be moved vertically relatively to the other. This gear turns in a bearing 50 on the inner part of the radial arm 12, and is held against vertical movement relative to the arm. The bevel gear 49 meshes with another bevel gear 52 on the inner end of a longitudinal shaft 53. The arm 12 is preferably hollow, and the shaft 53 is disposed inside it. The particular construction of arm shown comprises a tube, clamped at its inner end in a split sleeve 12$^a$ forming part of the same casting which includes the vertical sleeve 15. The shaft 53 drives the screw shaft 23 by means of meshing gears 54, 55 carried thereby, at the end of the arm where they are entirely accessible.

On the longitudinally traveling carriage are laterally and vertically adjustable carriages, one carried by the other, for positioning the jet means in the desired path of travel. The preferred construction of these parts will now be described.

The carriage 19 has in its under side a dovetailed guide-way 56, in which a laterally adjustable carriage 57 is mounted and guided. This carriage is shown as comprising a horizontal, plate-like portion beveled at its edges, to slide in the guide-way, and a depending strengthening rib, but it may obviously have other details of construction. At one end it is provided with a vertical, plate-like portion 58 having a vertical, dovetail guide-way in its outer face. Means are provided for adjusting the carriage 57, in the nature of a screw-shaft 59 journaled in a bearing 51 on the carriage 57 and having threaded engagement with a nut portion 60 on the carriage 19. A handle crank 61 secured to the end of this screw shaft affords convenient means for turning the same.

In the guide-way in the portion 58 of the carriage 57 a vertically adjustable carriage 62 is mounted slidably. This carriage may be in the nature of a plate or block having beveled edges to engage the guide-way. It is adjusted by means of a vertical screw 63 having an unthreaded portion journaled in a bearing 64 carried by the carriage 57. The threaded portion of the screw engages a tapped hole in the carriage 62, and a knurled head or handle 65 is secured to the upper end of the screw for manipulation.

A torch or burner-holder 66 is mounted on the carriage 62, and is adjustable to vary angularly the direction of the jets. Such holder may be constructed in a variety of ways. In the particular embodiment shown it comprises a split sleeve 67 having at one side a circular bearing cheek 68, which contacts with a circular bearing face on a raised portion 69 on the outer side of the carriage 62. A screw 70 passes through the centers of these bearing faces and forms a pivot about which the holder 66 may be turned to the desired angle and means for clamping the holder to the carriage 62 when adjustment has been effected.

The construction of the torch or burner equipment may be widely varied. In the particular construction illustrated a torch 71 is employed, having a cylindrical body 72 held in the sleeve 67. The torch may be slidably adjusted endwise in the sleeve, and may be clamped in the sleeve by means of a screw 73 drawing together the two edges of the split sleeve. The torch body is shown as having three conduits, 74, 75 and 76, in the nature of tubes held inside the cylindrical casing, and these conduits have suitable, valved connections at their rear ends, for the attachment of flexible tubes 77, 78 and 79. The tubes 74, 75 and 76 discharge into separate spaces or conduits in the head 80, which is of any suitable form. Any one of a set of removable tips 81 (see Fig. 10) or 82 (see Fig. 11) may be seated in the head, and held there by a nut 83. The particular construction of these tips may be varied. The form of tip shown forms the subject-matter of another application, being here selected as illustrative of one suitable form that I may employ. It has a conical rear portion seating in a corresponding recess in the head, and affording tight seals between the several kinds of gases and between the gases and the air, so that there can be neither leakage nor mixing of the gases before their entrance into the removable and replaceable tip.

The tip 81 is illustrative of a tip for cutting. It has a longitudinal bore 83 extending from end to end, for the passage of cutting oxygen to be delivered in a jet upon the work. It also has two longitudinal bores or mixing chambers 84$^a$, 84$^b$ opening through the forward end of the tip, for discharging a heating jet upon the work. Passages or admission ports 85$^a$, 85$^b$ and 86$^a$, 86$^b$ leading from the side of the sealing portion of the tip conduct the gases for the mixture to the passages 84$^a$, 84$^b$. The rear end of the bore 83 communicates with the conduit 74, which is connected with the source of supply of oxygen for cutting, and the ports 85 and 86 communicate with the conduits 75 and 76, which are connected, respectively, with the sources of supply of oxygen and acetylene for forming the heating mixture. The cutting tip is so placed in the head that its jets advance in line over the work, the cutting jet being preceded by a heating jet and followed by another. Instead of providing heating jets at both sides of the cutting jet, there may be heating only in advance of the cutting jet. While I mention these gases, it is obvious that others may be employed. The tip 82 is illustrative of a welding tip. It is shown as provided with a central mixing passage 84, with oxygen and acetylene admission ports or passages 85 and 86. The tips preferably have annular communication-establishing channels or grooves 87 encircling their rear, sealing portions, so that the passages in the tips will always communicate with the conduits in the body and head. Instead of removable and replaceable tips such as these, any other suitable provisions for mixing the gases and delivering the jets may be employed, the present invention not being concerned with these features.

The action of gas welding and cutting apparatus is familiar to those skilled in the art and need not be gone into here.

In operation, the shaft 33 is driven constantly by power. Through the friction members 35 and 36, the shafts 42 and 53, and the gears 54 and 55, the worm 23 is driven, and thus by its engagement with the wheel 24 clamped against rotation propels the carriages 18, 57 and 62, and causes the jet or jets of the torch or burner apparatus to travel along the line of the cut or weld. The jets are caused to travel either outward away from the standard or in the reverse direction, according to whether the friction wheel 35 is at one side or the other of the center of the friction disk 36. The operator may vary the speed of travel with entire convenience and the greatest delicacy by turning the handle 40$^a$ so as to shift the friction-disk in one direction or the other. Inasmuch as the success of machine welding or cutting is dependent directly upon the speed at which the jets travel, this exact control is of the utmost importance. The jets may be positioned precisely in the exact path of travel desired by vertical and lateral adjustment of the carriages or slides 57 and 62 and their manually-operated adjusting screws. A further, rough adjustment as to height may be secured by sliding the torch endwise in the sleeve 67. For welding and cutting and for different kinds of material, different angles of incidence of the jets are desirable. For this purpose the burner may be adjusted angularly in the vertical plane of the path of travel by loosening the screw 70 and swinging the torch holder more or less according to the nature of the case, then tightening the screw again. The radial arm with all the parts carried thereby may be raised and lowered to different heights with reference to the work or work support by means of the rack and pinion 13, 14. Not only may the rate of travel of the jets be varied to any speed within certain limits in the manner described, but the limits may be changed by removing the gears 54, 55 at the outer end of the arm and replacing them by others having a different ratio. The position of the gears makes this replacement convenient. The gears may be held to their shafts by nuts or in any other suitable manner permitting their removal and replacement. Thus, a very wide range of speeds is made possible.

The travel of the jets may be stopped and started by separating the friction drive members 35, 36 by means of the handle 47. The travel may also be stopped by turning the handle 30 so that the wheel 24 is free to revolve as a worm wheel, the carriage remaining stationary on the arm by virtue of the friction between the carriage and arm.

The carriage 19, with the burner and other parts may now be shifted rapidly either out or in on the arm to any desired position. When the wheel 24 is held against rotation again, the travel of the carriage will recommence immediately, since the wheel always remains in mesh with the screw.

In Figs. 10, 11 and 12 is illustrated a circular cutting or welding apparatus, designed more particularly as an attachment for the arm 12. This mechanism includes a suitable body or casting 100, having a horizontal opening 101 therethrough for the reception of the arm 12, by which it is supported. This horizontal tubular portion is split, and is provided with ears and clamp screws 102 for securing the casting in position on the arm. The body also has an opening 103, parallel to the opening 101, through which the screw 23 passes. In the top of the body is a chamber 104, with a cover 105, in which chamber is a worm wheel 106 engaging with the threads on the screw. The body also has a depending hollow stem or bearing 107, inside which is a rotatable, hollow spindle 108. The wheel 106 is adapted to be secured to the spindle by virtue of complementary conical friction surfaces thereon, a nut 109 with handles 110 on the upper end of the spindle serving to force the wheel into tight engagement with the spindle and also enabling the wheel and spindle to be readily disconnected.

At its lower end the spindle 108 carries an offset bracket or torch holder 111. In the particular embodiment illustrated this bracket comprises a collar 112 screwed onto the lower end of the spindle, the collar being split so that it may be tightened by means of a screw or bolt 113, a horizontal tubular portion 114 offset from the spindle, and a connecting piece 115, provided with an opening 116 therethrough.

Means are provided for raising and lowering the torch or burner, and preferably this is effected by raising and lowering the spindle 108. To this end a sleeve or bushing 117 is interposed between the tubular bearing 107 and the spindle, the bushing being held between a shoulder on the upper part of the spindle and the collar 112. Rack teeth 118 are formed on the side of the bushing and are engaged by a pinion 119 carried by the tubular bearing, this pinion having a handle 120 for convenient manipulation. The rack and pinion prevent the sleeve 117 from turning. Since raising and lowering of the spindle also raises and lowers the wheel 106, the teeth of the latter are not hobbed, so that they may move up and down relatively to the screw.

The torch or burner structure may be of any suitable construction, but preferably has a cylindrical body or casing 122, a head 123, and a removable and replaceable tip 81, for which may be substituted a welding tip 82. These tips are the same as already described. Whereas the tip in the form of torch previously described was preferably held in the head in alinement with the body, in this instance the tip is preferably disposed at an angle to the body. The torch body has three tubes or conduits 124, 125, 126, for cutting oxygen, heating (or welding) oxygen, and heating (or welding) acetylene, respectively. These tubes communicate with passages in a piece 127 at the rear end of the torch having three suitable valved connections 128, for the attachment of the flexible tubes 129, which are passed through the hollow spindle and the opening 116.

Means are provided for adjusting or moving the torch or burner radially. In the preferred construction, the torch body is clasped within a split sleeve or bushing 130, which is movable endwise inside the tubular part 114. For effecting the movement of the torch, the bushing is provided with rack teeth 131 with which engage gear teeth 132 formed on a shaft 133 mounted rotatably in a bearing in the bracket 111, the shaft having a handle 134 by means of which it may be turned. Rough adjustment may be secured by loosening the nut or bolt 135 of the split bushing, and sliding the torch endwise therein.

In operation, the screw 23 being driven, the screw drives the wheel 106, and the latter being fixed to the hollow spindle causes the jets to travel in a circular path, the radius of which may be varied as desired. The height at which the jets operate may also be varied. The radial movement of the torch by means of the rack and pinion gearing also enables the jets to be quickly moved away from the work as necessity may require. The travel of the jets may be stopped at any time by loosening the nut 109, so that the wheel 106 is disconnected from the hollow spindle.

I may note that for cutting it is customary to hold the torch, or rather the tip, vertical, while for welding the tip is usually inclined. In Figs. 1 and 7 I have shown the torch and cutting tip inclined, so as not to obscure the view of other parts.

What I claim as new is:

1. In a machine for the cutting or welding of metals by means of gases, the combination of a standard, a vertically adjustable horizontal arm thereon, means for raising and lowering the same, a longitudinal screw carried by said arm, variable speed power-driving means for the screw, a longitudinally-movable carriage guided on the arm and driven by said screw, a transversely-adjustable carriage guided on the longitudinally-movable carriage, means for moving and holding said transversely-adjustable carriage, a vertically-adjustable carriage guided on the transversely-adjustable carriage, means for moving and holding said vertically-adjustable carriage, and a torch or burner carrier angularly adjustable in a vertical longitudinal plane on said vertically-movable carriage.

2. In a machine for the cutting or welding of metals by means of gases, the combination of a standard, a vertically adjustable horizontal arm thereon, a longitudinal screw carried by said arm, means for revolving the screw, a longitudinally-movable carriage guided on the arm and driven by said screw, a transversely-adjustable carriage guided on the longitudinally-movable carriage, a vertically-adjustable carriage guided on the transversely-adjustable carriage, and a torch or burner carrier angularly adjustable in a vertical longitudinal plane on said vertically-movable carriage.

3. A machine for the cutting and welding of metals by means of gases, comprising, in combination, a base, a vertical standard, a radial arm supported by said standard, a torch holder on the arm, change speed driving mechanism housed in said base, a vertical driven shaft extending upward from said mechanism at the standard, and gearing driven by said shaft for propelling said torch holder in the direction of the length of the arm.

4. In a machine for the cutting or welding of metals by means of gases, the combination of a standard, a horizontal arm thereon, a longitudinal screw on the arm, a longitudinally traveling carriage on the arm driven by the screw, a torch transported by said carriage, a shaft extending longitudinally of the arm, gears connecting the outer ends of the screw and shaft, variable speed and reversing gearing at the base of the standard, and a vertical shaft driven by said gearing and geared to the inner end of said longitudinally-extending shaft.

5. In a machine for the cutting or welding of metals by means of gases, the combination of a guide, a traveling carriage mounted on said guide, a torch transported by said carriage, a screw for driving the carriage, a rotatable toothed wheel on the carriage meshing with the screw, and means for holding said wheel against rotation so as to act as a nut.

6. In a machine for the cutting or welding of metals by means of gases, the combination of a guide, a traveling carriage mounted on said guide, a torch transported by said carriage, a screw for driving the carriage, a toothed wheel on the carriage meshing with the screw, a set screw for clamping said wheel against movement, a washer interposed between the set screw and wheel, and means prohibiting rotation of said washer.

7. In a machine for the cutting or welding of metals by means of gases, the combination of a standard, a support vertically adjustable thereon, means for holding said support at any adjustment, a freely projecting arm carried wholly by said support, means carried by the arm for delivering a jet or jets of gases, a change-speed gearing housed in the base of the standard, a driving connection outside the standard, a vertical shaft driven by said change-speed gearing extending upward at the standard, and means for propelling said jets lengthwise of the arm including a gear carried by said vertically adjustable support and driven by and slidable on said vertical shaft.

8. In a machine for the cutting or welding of metals by means of gases, the combination of a standard, a radial arm vertically adjustable thereon, a longitudinal screw on the arm, a longitudinally traveling carriage on the arm driven by said screw, a torch or burner carrier transported by said carriage, means for revolving the screw comprising a change-speed friction gearing at the base of the standard, a vertical shaft extending from the friction-gearing to the inner end of said arm, and gearing connecting said shaft with the screw including a gear splined to the shaft so as to permit the vertical adjustment of the arm.

9. In a machine for the cutting or welding of metals by means of gases, the combination of a standard, a horizontal arm thereon, a longitudinal screw on the arm, a longitudinally traveling carriage on the arm driven by the screw, a torch or burner carrier transported by said carriage, a shaft extending longitudinally of the arm, gears connecting the outer ends of said screw and shaft, and means for driving the shaft at the inner end thereof.

10. In a machine for the cutting or welding of metals by means of gases, the combination of a standard, a hollow horizontal arm thereon, a longitudinal screw on the arm, a longitudinally traveling carriage on the arm driven by the screw, a torch or burner carrier transported by said carriage, a shaft extending longitudinally inside the arm, gears connecting the outer ends of said screw and shaft, and means for driving the shaft at the inner end thereof.

In witness whereof I have signed my name in the presence of two subscribing witnesses.

JOHN WALTER WHITFORD.

Witnesses:
J. F. BRANDENBURG,
W. C. BUCKNAM.